United States Patent [19]

Himes

[11] Patent Number: 5,093,422

[45] Date of Patent: Mar. 3, 1992

[54] LOW STRESS RELAXATION EXTRUDABLE ELASTOMERIC COMPOSITION

[75] Inventor: Glenn R. Himes, Houston, Tex.

[73] Assignee: Shell Oil Company, Houston, Tex.

[21] Appl. No.: 513,417

[22] Filed: Apr. 23, 1990

[51] Int. Cl.$^5$ .............................................. C08L 53/00
[52] U.S. Cl. ...................... 525/98; 525/89; 525/95
[58] Field of Search ................................ 525/98

[56] References Cited

U.S. PATENT DOCUMENTS

| | | | |
|---|---|---|---|
| H815 | 9/1990 | Willis et al. | 525/338 |
| 3,299,174 | 1/1967 | Kuhre et al. | 525/98 |
| 3,325,430 | 6/1967 | Graseley | 525/98 |
| 3,465,063 | 9/1969 | Hassell et al. | 525/98 |
| 3,830,767 | 8/1974 | Condon | 525/98 |
| 3,870,676 | 3/1975 | Condon | 525/98 |
| 4,032,491 | 6/1977 | Schoenke | 524/68 |
| 4,501,842 | 2/1985 | Chmiel et al. | 525/95 |
| 4,560,727 | 12/1985 | Crossan | 525/98 |
| 4,579,912 | 4/1986 | Cauterino et al. | 525/98 |
| 4,609,697 | 9/1986 | Albers | 524/70 |
| 4,698,389 | 10/1987 | Shyu et al. | 525/96 |
| 4,716,201 | 12/1987 | Canterino et al. | 525/98 |
| 4,749,747 | 6/1988 | Shyu et al. | 525/95 |
| 4,785,043 | 11/1988 | Kuwai et al. | 525/98 |
| 4,906,687 | 3/1990 | Modic | 525/98 |

*Primary Examiner*—Melvyn I. Marquis
*Assistant Examiner*—W. R. H. Clark
*Attorney, Agent, or Firm*—Donald F. Haas

[57] ABSTRACT

An extrudable elastomeric composition includes an elastomeric polymer and a tackifying resin in which the extrudable elastomeric composition is adapted to form an elastic sheet having a stress relaxation or less than about 30 percent. The elastomeric polymer is a styrene-poly(ethylene-propylene)-styrene thermoplastic elastomeric block copolymer or a mixture of styrene-poly(ethylene-propylene)-styrene and styrene-poly(ethylene-butylene)-styrene elastomeric block copolymers. The extrudable elastomeric composition may also include a polyolefin and/or an extending oil.

4 Claims, 3 Drawing Sheets

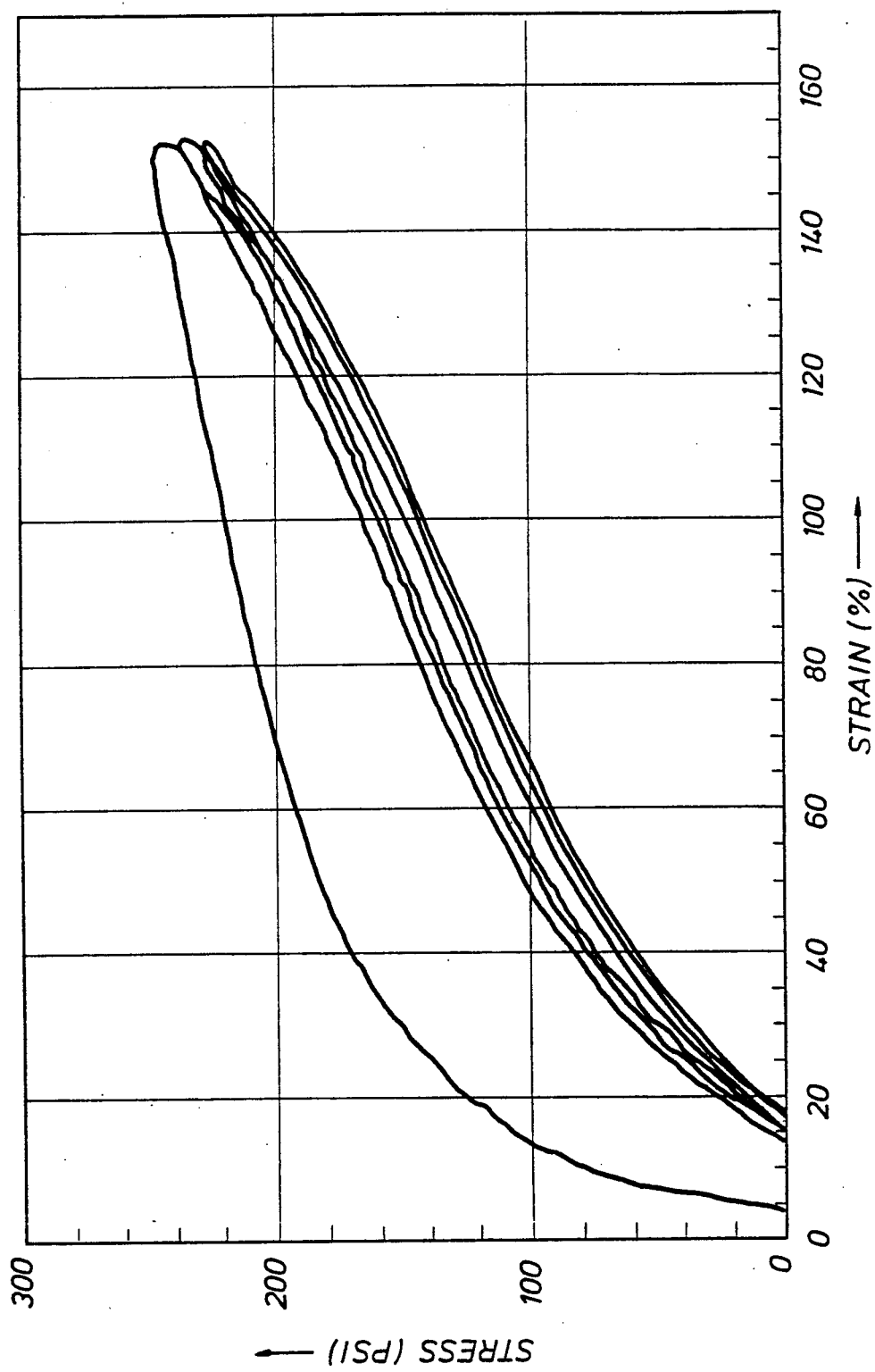

LOW STRESS RELAXATION EXTRUDABLE ELASTOMERIC COMPOSITION

BACKGROUND OF THE INVENTION

There has been a continuing need for extrudable elastomeric compositions which can be easily extruded into elastic sheets having low stress relaxation, low hysteresis and high recoverable energy. This need has persisted in spite of the fact that such elastic sheets could readily be utilized in the manufacture of a wide variety of garments of both the disposable type, such as disposable diapers, or the durable type, such as pants, dresses, blouses and sporting wear, for example, sweatsuits. Further, such elastic sheets could also be utilized in, for example, upholstery, drapery, liner and insulation applications. The traits of low initial load tension, low stress relaxation, low hysteresis and high recoverable energy are particularly desirable characteristics for elastic sheets used in these areas because articles manufactured from such materials may be easily put on the body of the wearer or any item, such as a fixed frame, around which the materials may be wrapped. Those traits are also very useful because articles manufactured from such materials are able to closely conform to the body of a wearer or any item and repeatedly extend and retract without sagging.

Styrene-poly(ethylene-butylene)-styrene elastomeric block copolymers have been blended with other materials such as, for example, polyolefins and tackifying resins to form extrudable elastomeric compositions which can be more easily extruded into elastic sheets having improved processing and/or bonding properties. While the additives improve the extrusion properties of the compositions and the processing and/or bonding properties of the elastic sheet, such additives may, in certain situations, have an adverse affect on the elastic properties of the resulting sheet. For example, such elastomeric block copolymers blended with large amounts of a polyolefin and/or hydrocarbon resin may have poor stress relaxation properties and stress-strain tests of such materials show significant hysteresis.

DEFINITIONS

The term "elastic" is used herein to mean any material which, upon application of a biasing force, is stretchable, that is, elongatable at least about 60 percent (i.e., to a stretched, biased length which is at least about 160 percent of its relaxed unbiased length), and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the term "nonelastic" refers to any material which does not fall within the definition of "elastic", above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length - final sample length)/(maximum stretch length - initial sample length)] X 100.

As used herein, the term "stress relaxation" refers to the percent loss of tension or load between the maximum load or force encountered after elongating an elastic material at a specified rate of extension to a predetermined length (or the load or force measured at some initial length) and the remaining load or force measured after the sample has been held at that length for a specified period of time, for example, from about 0 minutes to about 30 minutes. Except where otherwise noted for the present invention, stress relaxation is expressed as a percentage loss of the initial load encountered at a specified extension of an elastic material. The stress relaxation is determined by calculating the difference between the initial maximum load measured after elongating an elastic material at a rate of 20 inches per minute to an elongation of 160 percent (i.e., to 260 percent of the material's initial length) and the remaining load measured after that sample was held at that length for 30 minutes divided by the initial maximum load at that length. Testing may be performed on an Instron Model 1122 Universal Test Machine using a 100 mm by 3 inch sample attached to jaw faces that have a width of 3 inches and a height of 1 inch. Stress relaxation after 30 minutes at, for example, an elongation of 160% (i.e., to 260% of the material's initial length - from 100 mm to 260 mm) may be expressed as a percentage utilizing the following equation: stress relaxation=(peak load$_{160\%}$-load $_{160\%}$@30min)/(peak load $_{160\%}$)* 100

As used herein, the term "tensile strength" refers to the resistance of an elastic material to being elongated as determined in accordance with ASTM D-412 using 3mm wide (approximately 0.1 inch) and 0.020 inch thick dumbbell samples that are cut from films. Films formed from an elastomeric block copolymer were cast from a toluene solution and films formed from a blend of an elastomeric block copolymer and other materials such as, for example, a polyolefin, a tackifier, and/or an extending oil were compression molded. Tensile testing may be performed on an Instron Model 1122 Universal Test Machine. An alternative tensile test specimen is a 100 mm by 3 inch sample attached to jaw faces that have a width of 3 inches and a height of 1 inch.

As used herein, the term "recoverable energy" refers to the energy stored by an elastic material when it is elongated to a specified length. Recoverable energy is measured utilizing a tensile testing apparatus such as, for example, an Instron Model 1122 Universal Test Machine by elongating a sample of an elastic material sample at 1 inch/minute to 150 percent elongation (i.e., to 250 percent of the material's initial relaxed length) and cycling back to zero load for 1 hysteresis loop. The percent recoverable energy is determined by dividing the area under the retraction curve of the first hysteresis loop by the area under the elongation curve of the first hysteresis loop and then multiplying by 100.

As used herein, the terms "dynamic" or "dynamic hysteresis" refer to the difference between the energy retained by an elastic material during retraction from a specified stretched length and the energy required to subsequently elongate the elastic material to that previous length. The dynamic is measured utilizing a tensile testing apparatus such as, for example, an Instron Model 1122 Universal Test Machine by elongating a sample of an elastic material sample at 1 inch/minute to 150 percent elongation (i.e., to 250 percent of the material's initial relaxed length), cycling back to zero load for 1 hysteresis loop and then elongating the material again at 1 inch/minute to 150 percent elongation. The percent dynamic is determined by subtracting the area under the retraction curve of the first hysteresis loop from the area under the elongation curve of the second hysteresis loop, dividing that amount by the area under the elongation curve of the first hysteresis loop, and then multiplying by 100.

As used herein, the term "loss" refers to the decrease in resistance to elongation of an elastic material after that elastic material has been elongated to a specified length and then allowed to recover. The loss is measured utilizing a tensile testing apparatus such as, for example, an Instron Model 1122 Universal Test Machine by elongating a sample of an elastic material sample at 1 inch/minute to 150 percent elongation (i.e., to 250 percent of the material's initial relaxed length), cycling back to zero load for 1 hysteresis loop and then elongating the material again at 1 inch/minute to 150 percent elongation. The percent loss is determined by dividing the area under the elongation curve of the second hysteresis loop by the area under the elongation curve of the first hysteresis loop, subtracting that value from one (1), and then multiplying by 100.

As used herein, the terms "set" or "percent set" refer to the deformation of an elastic material measured while the material is in a relaxed condition immediately after the material was released from a specified elongation, without allowing the material to snap back. The percent set is determined by dividing the zero load extension after 1 cycle by the initial sample gauge length, and then multiplying by 100. The zero load extension is the distance that the jaws of the tensile test equipment move at the beginning of the second cycle before a load is registered by the tensile test equipment. The set may be measured utilizing a tensile testing apparatus such as, for example, an Instron Model 1122 Universal Test Machine by elongating a sample of an elastic material at 1 inch/minute to 150 percent elongation and cycling back to zero load for 1 hysteresis loop.

As used herein, the term "set at break" refers to the deformation of an elastic material measured after the material has been elongated to break. The set at break is measured in accordance with ASTM D 412 in which, ten minutes after the sample is broken, the two pieces of the sample are fitted together so they substantially match up over the full area of the break. The percent set at break is determined by subtracting the original distance between the bench marks from the distance between the joined pieces, dividing by the original distance between the bench marks and then multiplying by 100.

As used herein, the term "sheet" refers to a layer which may either be a film or a nonwoven web.

As used herein, the term "nonwoven web" means a web having a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "melt flow rate" refers to the amount of material under a pressure or load that flows through an orifice at a given temperature over a specified period of time. The melt flow rate is expressed in units of weight divided by time (i.e., grams/10 minutes). The melt flow rate was determined by measuring the weight of the polymer under a 2.160 kg load that flowed through an orifice diameter of $2.0955 \pm 0.0051$ mm during a specified time period such as, for example, 10 minutes at a specified temperature such as, for example, 190° C. as determined in accordance with ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pennsylvania).

As used herein, the term "average molecular weight" refers to the number average molecular weight of a polymer or polymer fragment utilizing conventional gel permeation chromatography techniques. All molecular weights are measured prior to hydrogenation which will increase them by a small amount.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

As used herein, the term "compatible" refers to the relationship of one polymeric material to another with respect to the extrusion process and extrudates. To be compatible, two different polymeric materials should, for example, be capable of blending into a substantially homogeneous mixture.

SUMMARY OF THE INVENTION

The present invention addresses problems of the prior art by providing an extrudable elastomeric composition composed of: (1) a styrene-poly(ethylene-propylene)-styrene thermoplastic elastomeric block copolymer or a mixture of styrene-poly(ethylene-propylene)-styrene and styrene-poly(ethylene-butylene)-styrene elastomeric block copolymers, either of which may be linear, branched, star or radial; and (2) a tackifying resin in which the composition is adapted to be extruded into an elastic sheet having a stress relaxation of less than about 30 percent.

The preferred linear styrene-poly(ethylene-propylene)-styrene thermoplastic elastomeric block copolymer component of the extrudable elastomeric composition of the present invention has the general formula:

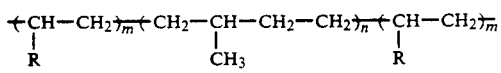

wherein m is an integer of at least about 38, for example, from about 38 to about 337; and n is an integer of at least about 500, for example, from about 500 to about 1860; and R is a phenyl group or substituted phenyl group, e.g., with tert-butyl or para methyl substitution. If m and n are both too low, then the polymer is too fluid and does not have sufficient strength. If m and n are both too high, then the polymer is not processable. The styrene-poly(ethylene-propylene)-styrene elastomeric block copolymer typically has an average molecular weight ranging from about 50,000 to about 90,000 and an average molecular weight ratio of polystyrene endblocks to poly(ethylene-propylene) midblocks ranging from about 10:90 to about 25:75. If the styrene ratio is too low, the polymer has poor strength and there is an overdependence on basis weight to achieve the desired properties—more material will be needed at increased cost. If the styrene ratio is too high, the polymer will be too highly oriented, too stiff and exhibit poor hand and drape. For example, one particularly useful styrene-poly(ethylene-propylene)-styrene elastomeric block copolymer has an average molecular weight of about 62,000 with polystyrene endblocks each having an average molecular weight of about 6200 and an average molecular weight ratio of polystyrene endblocks to poly(ethylene-propylene) midblocks of about 21.7:78.3.

In some situations, it may be desirable to blend the styrene-poly(ethylene-propylene)-styrene elastomeric block copolymer with another elastomeric block copolymer such as, for example, a styrene-poly(ethylene-butylene)-styrene block copolymer to form an elastomeric block copolymer mixture. Such a mixture may be used in place of a substantially pure styrene-poly(ethylene-propylene)-styrene elastomeric block copolymer and still achieve the desired stress-relaxation properties.

The tackifying resin component of the extrudable elastomeric composition may be, for example, hydrogenated hydrocarbon resins and/or terpene hydrocarbon resins. The extrudable elastomeric composition may further include a polyolefin and/or an extending oil. The polyolefin component of the extrudable elastomeric composition may be selected from, for example, polyethylene, polypropylene, polybutylene, ethylene copolymers, propylene copolymers, butylene copolymers and mixtures thereof. The extending oil may be a mineral oil such as, for example, a white mineral oil.

The extrudable elastomeric composition may contain from about 50 to about 80 percent, by weight, of the styrene-poly(ethylene-propylene)styrene elastomeric block copolymer or the mixture of styrene-poly(ethylenepropylene)-styrene and styrene-poly(ethylene-butylene)-styrene elastomeric block copolymers, from about 15 to about 28 percent by weight of the tackifying resin, if it is to be used, from about 3 to about 25 percent by weight of the polyolefin and from about 0 to about 15 percent by weight of the extending oil.

BRIEF DESCRIPTION OF THE DRAWINGS

FIG. 3 is an exemplary stress-strain curve for an elastic sheet formed from a modified extrudable elastomeric composition including a styrene-poly(ethylene-butylene)-styrene thermoplastic elastomeric block copolymer.

DETAILED DESCRIPTION OF THE INVENTION

Figure 1:
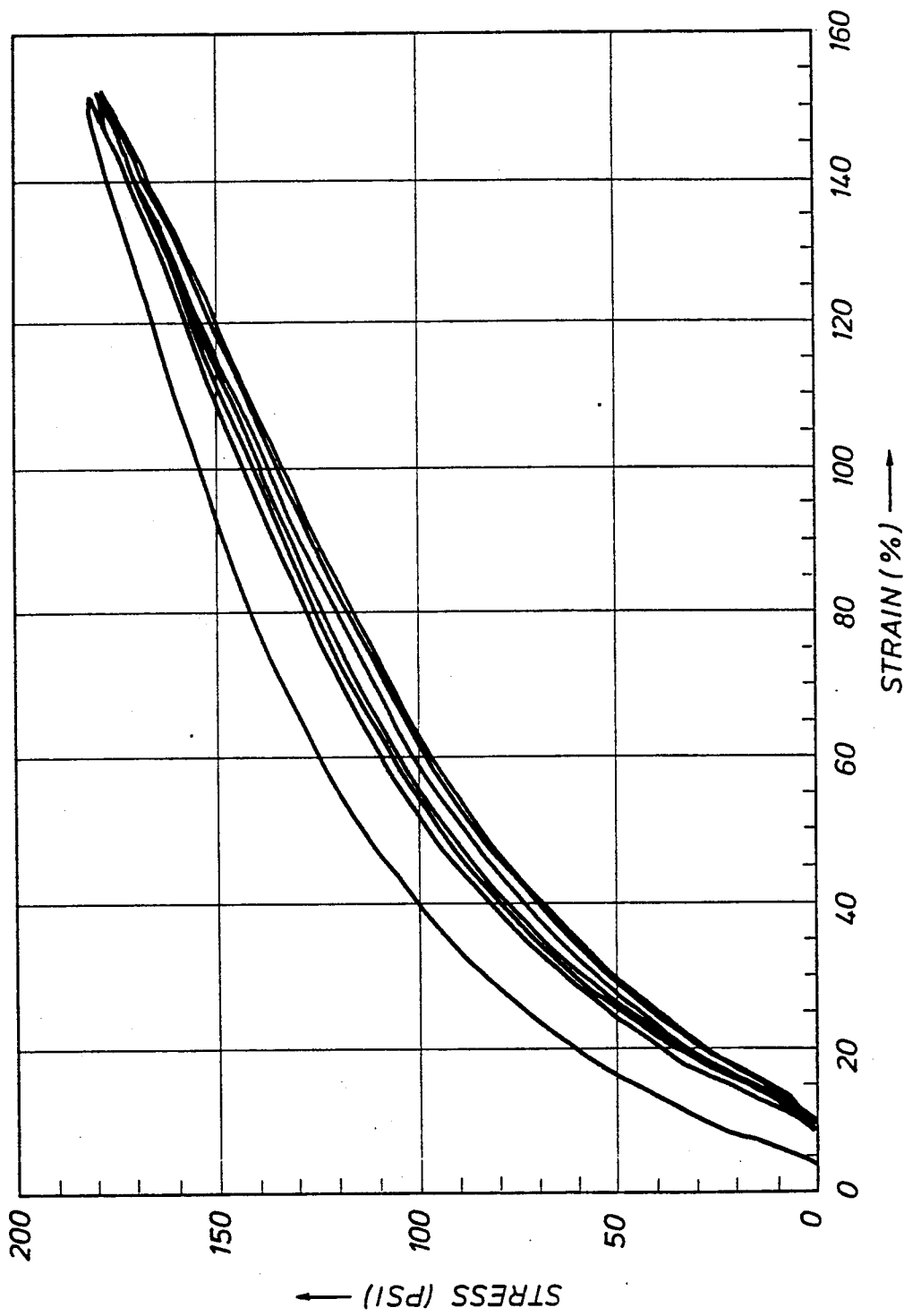
FIG. 1 is an exemplary stress-strain curve for an elastic sheet formed from an extrudable elastomeric composition including a styrene-poly(ethylene-propylene)-styrene elastomeric block copolymer.
Figure 2:
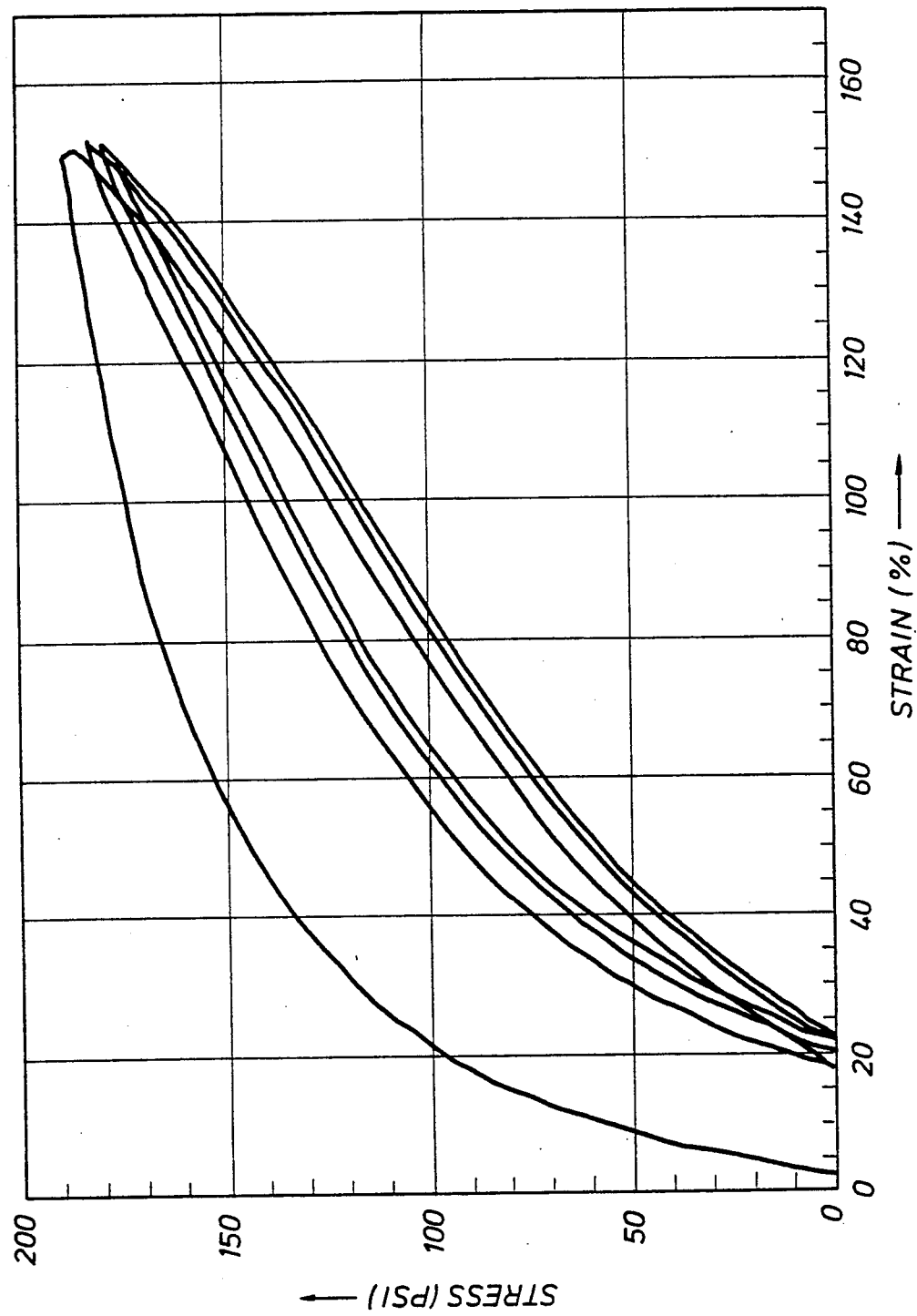
FIG. 2 is an exemplary stress-strain curve for an elastic sheet formed from an extrudable elastomeric composition including a styrene-poly(ethylene-butylene)-styrene elastomeric block copolymer.

The sheet of the present invention contains an extrudable elastomeric composition which is composed of (1) a styrene-poly(ethylene-propylene)-styrene thermoplastic elastomeric block copolymer or a mixture of styrene-poly(ethylene-propylene)-styrene and styrene-poly(ethylene-butylene)-styrene elastomeric block copolymers and (2) a tackifying resin. The extrudable elastomeric composition may also include a polyolefin and/or an extending oil. The block copolymers may be linear, branched, star or radial polymers.

The styrene-poly(ethylene-propylene)-styrene thermoplastic elastomeric block copolymer component has a general formula of:

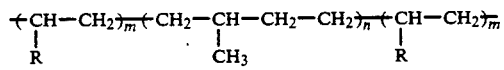

wherein m has a value of at least about 38, for example, from about 38 to about 337; and n has a value of at least about 500, for example, from about 500 to about 1860; and R is a phenyl group or substituted phenyl group such as with tert-butyl or para methyl groups. Particularly useful values for m range from about 48 to about 87 resulting in a polystyrene endblock having an average molecular weight from about 5,000 to about 9,000. Particularly useful values for n range from about 570 to about 1000 resulting in a poly(ethylene-propylene) midblock having an average molecular weight from about 40,000 to about 70,000. In the above formula, the midblock is shown with a 1,4 orientation. It may also have a 1,2 or a 3,4 orientation. The best elastomeric properties are obtained if 1,4 orientation is greater than about 85%. The total molecular weight of the polymer may be, for example, from about 50,000 to about 90,000. Such rubbery block copolymers may have an average molecular weight ratio of polystyrene endblocks to poly(ethylene-propylene) midblocks from about 10:90 to about 25:75. For example, one styrene-poly(ethylene-propylene)-styrene elastomeric block copolymer (SEPS) useful in the present invention is available from the Shell Chemical Company and has an average molecular weight of about 62,000 with polystyrene endblocks each having an average molecular weight of about 6200 and an average molecular weight ratio of polystyrene endblocks to poly(ethylene-propylene) midblocks of about 21.7:78.3. Exemplary properties of that SEPS polymer are given in Table 1.

TABLE 1

STYRENE-POLY(ETHYLENE-PROPYLENE)-STYRENE
BLOCK COPOLYMER
Physical Properties*

| | |
|---|---|
| Tensile Strength, psi | 2260 |

TABLE 1-continued

STYRENE-POLY(ETHYLENE-PROPYLENE)-STYRENE
BLOCK COPOLYMER
Physical Properties*

| | |
|---|---|
| 300% Modulus, psi | 740 |
| Elongation at Break, % | 550 |
| Stress Relaxation, % | 23 |
| Hysteresis Properties: | |
| Recoverable Energy, % | 77 |
| Set, % | 9 |

*Determined using 3 mm wide (approximately 0.1 inch) and 0.020 inches thick dumbbell samples cut from films cast from toluene solution.

In some situations, it may be desirable to blend the styrene-poly(ethylene-propylene)-styrene elastomeric block copolymer with another elastomeric block copolymer such as, for example, a styrene-poly(ethylene-butylene)-styrene block copolymer to form an elastomeric block copolymer mixture. Such a mixture may be used in the present invention in place of a substantially pure styrene-poly(ethylene-propylene)-styrene elastomeric block copolymer and still achieve the desired stress-relaxation properties. The benefits of styrene-poly(ethylene-propylene)-styrene block copolymer may be expressed in mixtures containing up to about 45 parts by weight of styrene-poly(ethylene-butylene)-styrene elastomeric block copolymer per 100 parts of elastomeric block copolymer and down to about 55 parts by weight of styrene-poly(ethylene-propylene)-styrene elastomeric block copolymer per 100 parts of elastomeric block copolymer. One useful styrene-poly(ethylene-butylene)-styrene elastomeric block copolymer has an average molecular weight of about 50,000 with polystyrene endblocks having an average molecular weight of about 7200 and an average molecular weight ratio of polystyrene endblocks to poly(ethylene-butylene) midblocks of about 30:70. Such a styrene-poly(ethylene-butylene)-styrene block copolymer may be obtained from the Shell Chemical Company under the trade designation KRATON ® G-1652.

These polymers may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein: R is an aliphatic, cycloaliphatic, aromatic or alkyl-substituted aromatic hydrocarbon radical having from 1 to about 20 carbon atoms; and n is an integer of 1 to 4.

In addition to sequential techniques to obtain triblocks and higher orders of repeating structures, at least anionic initiators can be used to prepare diblocks of styrene-polydiene having a reactive ("live") chain end on the diene block which can be reacted through a coupling agent to create, for example, $(S-I)_x \cdot Y$ or $(S-B)_x \cdot Y$ structures wherein x is an integer from 2 to about 30, Y is a coupling agent, I is isoprene, B is butadiene and greater than 65% of S-I or S-B diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVB. Depending on the selected coupling agent the final polymer can be a linear triblock polymer (x=2), i.e., S.I.Y.I.S; or branched, radial or star configurations. The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene. Even styrene/diene ratios of 0/100 or 100/0 are permissible in some arms of multi-arm polymers as long as enough styrene blocks over about 5000 mol. wt. are present in the overall polymer to form a morphology giving a strong network of styrene domains connected through diene polymer chains.

It is contemplated that the coupled structures discussed above would be hydrogenated, giving $(S-EP)_x \cdot Y$ or $(S-EB)_x \cdot Y$ final compositions, where EP is poly(ethylene-propylene), EB is poly(ethylene-butylene), x is the number of arms and Y is the coupling agent. Since the number of (S-EP) [or (S-EB)] arms in a star polymer can be large, the molecular weights of star polymers within the invention can be much larger than those of linear, branched or radial styrene-ethylene/propylene polymers, i.e., up to 500,000 or higher. Such higher molecular weight polymers have the viscosity of lower molecular weight linear polymers and thus are processable in spite of the high molecular weight.

Such elastomeric branched or radial (star) polymers may have the formula:

$$[S_m\text{-}(EP)_w]_x\text{-}Y \text{ or } [S_m\text{-}(EB)_w]_x\text{-}Y$$

wherein S is a polystyrene block, EP denotes a poly(ethylene-propylene) block, EB denotes a poly(ethylene-butene) block, m is an integer from about 38 to about 337, w is an integer from about 250 to about 930, x is an integer from about 2 to about 30 and Y is a coupling agent. Mixtures of the above may also be used.

Other elastomeric polymers useful herein include those of the formula:

$$[S_m\text{-}(EP)_w]_z \text{ or } [S_m\text{-}(EB)_w]_z$$

where the common terms have the meanings described above, z is an integer from about 2 to about 7 and the S-(EP) and S-(EB) units are chemically attached headto-tail, head-to-head, or tail-to-tail fashion. Block formation may be by sequential polymerization, coupling or combinations thereof.

The polymers must be hydrogenated. In general, the hydrogenation or selective hydrogenation of the polymer may be accomplished using any of the several hydrogenation processes known in the prior art. For example the hydrogenation may be accomplished using methods such as those taught, for example, in U.S. Pat. Nos. 3,494,942; 3,634,594; 3,670,054; 3,700,633 and U.S. Pat. No. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl.

In general, the hydrogenation will be accomplished in a suitable solvent at a temperature within the range from about 20° C. to about 80° C. and at a hydrogen partial pressure within the range from about 100 psig to about 5,000 psig, preferably about 100 psig to 1,000 psig. Catalyst concentrations within the range from about 50 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

Various tackifying resins can be used in the present invention. In particular, the purpose of the tackifying resin is to provide an elastomeric web that can act as a pressure sensitive adhesive, e.g., to bond the elastomeric sheet to another web or layer of material. Of course, various tackifying resins are known, and are discussed, e.g., in U.S Pat. Nos. 4,789,699, 4,294,936 and 3,783,072, the contents of which, with respect to the tackifier resins, are incorporated herein by reference. Any tackifier resin can be used which is compatible with the elastomeric polymer and the polyolefin, and can withstand the high processing (e.g., extrusion) temperatures. Generally hydrogenated hydrocarbon resins are preferred tackifying resins, because of their better temperature stability. The following paragraphs disclose information on three specific tackifying resins, two of which (REGALREX® and ARKON®P series tackifiers) are examples of hydrogenated hydrocarbon resins, and the ZONATAC®501 lite being a terpene hydrocarbon. Of course, while the three tackifying resins are specifically discussed, the present invention is not limited to use of such three tackifying resins, and other tackifying resins which are compatible with the other components of the composition and can withstand the high processing temperatures, and can achieve the objectives of the present invention, can also be used.

REGALREZ® hydrocarbon resins, a product of Hercules, Incorporated, are fully hydrogenated α-methyl styrene-type low molecular weight hydrocarbon resins, produced by polymerization and hydrogenation of pure monomer hydrocarbon feed stocks. Grades 1094, 3102, 6108 and 1126 are highly stable, light-colored low molecular weight, nonpolar resins suggested for use in plastics modification, adhesives, coatings, sealants and caulks. The resins are compatible with a wide variety of oils, waxes, alkyds, plastics and elastomers and are soluble in common organic solvents.

ZONATAC®501 lite resin, a product of Arizona Chemical Co., has a softening point of 105° C., a Gardner color (50% in heptane) of 1 - and a Gardner color neat (pure) of 2+; (A Gardner color of 1 -(50% heptane) is approximately equal to APHA color=70.), a specific gravity (25°/25° C.) of 1.02 and a flash point (closed cup, °F.) of 480° F.

The polyolefin which may be utilized in the extrudable composition must be one which, when blended with the elastomeric block copolymer or a mixture of elastomeric block copolymers and subjected to an appropriate combination of elevated pressure and elevated temperature conditions, is extrudable, in blended form, with the elastomeric block copolymer or a mixture of elastomeric block copolymers. In particular, preferred polyolefin materials include polyethylene, polypropylene and polybutylene, including ethylene copolymers, propylene copolymers and butylene copolymers. Blends of two or more of the polyolefins may be utilized.

One particular polyethylene may be obtained form U.S.I. Chemical Company under the trade designation Petrothene NA 601 (also referred to herein as PENA 601). Information obtained from U.S.I. Chemical Company states the PENA 601 is a low molecular weight, low density polyethylene for application in the areas of hot melt adhesives and coatings. U.S.I. has also stated the PE NA 601 has the following nominal values: (1) a Brookfield viscosity, cP at 150 degrees Centigrade of 8,500 and at 190 degrees Centigrade of 3,300 when measured in accordance with ASTM D 3236; (2) a density of 0.903 grams per cubic centimeter when measured in accordance with ASTM D 1505; (3) and equivalent Melt index of 2,000 grams per 10 minutes when measured in accordance with ASTM D 1238; (4) a ring and ball softening point of 102 degrees Centigrade when measured in accordane with ASTM E 28; (5) a tensile strength of 850 pounds per square inch when measured in accordance with ASTM D 638; (6) an elongation of 90% when measured in accordance with ASTM D 638; (7) a modulus of rigidity, Tf(45,000) of −34 degrees Centigrade; and (8) a penetration hardness (tenths of mm) at 77 degrees Fahrenheit of 3.6.

Of course, the present invention is not limited to use of such specific polyolefins described herein. In this regard, note the polyolefins as described in U.S. Pat. Nos. 4,663,220 and 4,789,699, the contents of which are incorporated herein by reference. More generally, and noting the specific purpose of the polyolefin, as described in U.S. Pat. Nos. 4,663,220 and 4,789,699, various polyolefins which can be utilized in the present invention can easily be determined.

Extending oils which may be used in the extrudable elastomeric composition should be capable of being melt-processed with the other components of the extrudable elastomeric composition without degrading. An exemplary extending oil is a white mineral oil available under the trade designation Drakeol 34 from the Pennzoil Company Pennreco Division. Drakeol 34 has a specific gravity of 0.864–0.878 at 60° F., a flash point of 460° F., and viscosity of 370–420 SUS at 100° F. Suitable vegetable oils and animal oils or their derivatives may also be used as the extending oil.

The components of the extrudable elastomeric composition used to form the elastic sheet can be utilized over broad ranges of the amounts of each component.

As a guide, the best results have been obtained when utilizing a four component extrudable elastomeric composition of a styrene-poly(ethylene-propylene)-styrene (SEPS) elastomeric block copolymer or a mixture of styrene-poly(ethylene-propylene)-styrene (SEPS) and styrene-poly(ethylene-butylene)-styrene (SEBS) elastomeric block copolymers, a polyolefin, if used at all, a tackifying resin and an extending oil. The following ranges, as shown in Table 2, are exemplary. It is emphasized that these ranges are merely illustrative, serving as a guide for amounts of the various components in the composition.

TABLE 2

| | Weight % |
|---|---|
| SEPS elastomeric block copolymer or mixture of SEPS and SEBS elastomeric block copolymers | 50–80 |
| Tackifier | 15–28 |
| Polyolefin | 3–25 |
| Extending Oil | 0–15 |

As stated previously, while the extrudable elastomeric composition used to form the elastic sheet has been discussed in terms of a four-component extrudable composition of (1) styrene-poly(ethylene-propylene)-styrene elastomeric polymer or mixture of styrene-poly(ethylene-propylene)-styrene and styrene-poly(ethylene-butylene)-styrene elastomeric block copolymers; (2) polyolefin; (3) tackifying resin; and (4) extending oil; the polyolefin, which functions as a flow-promoter for the composition can be substituted by other compatible flow promoters or processing aids, or can be eliminated altogether where the tackifying resin can also act as the flow promoter and/or extending oil. The extending oil, which functions as a processing aid, may also be substituted by other compatible processing aids or can be eliminated altogether where the tackifying resin can also act as the extending oil. For example, low molecular weight hydrocarbon resins such as REGALREZ® tackifier can also act as the viscosity reducer and/or the extending oil, whereby the extrudable composition may contain the elastomeric polymer(s) and the tackifying resin (e.g., REGALREZ® tackifier).

While the principal components of the extrudable elastomeric composition used to form the elastic sheet have been described in the foregoing, such extrudable elastomeric composition is not limited thereto, and can include other components not adversely affecting the extrudable elastomeric composition attaining the stated objectives. Exemplary materials which could be used as additional components would include, without limitation, pigments, antioxidants, stabilizers, surfactants, waxes, flow promoters, solvents, particulates and materials added to enhance processability of the composition.

Extrudable elastomeric compositions containing the recited levels of additives such as, for example, a blend of 57.7 percent, by weight styrene-poly(ethylene-propylene)-styrene elastomeric block copolymer (molecular weight 62,000) available from the Shell Chemical Company; 18.3 percent, by weight, Petrothene NA 601 (polyethylene); 18.2 percent, by weight, REGALREZ®1126 (hydrocarbon tackifying resin); and 5.8 percent, by weight, Drakeol 34 (white mineral oil) have unexpectedly low levels of stress relaxation when formed into meltblown webs as shown in FIG. 1 and when processed into films as shown in Table 3, particularly when compared with films and meltblown webs formed from conventional KRATON® rubbers such as, for example, a blend containing 63 percent, by weight, styrene-poly(ethylene-butylene)-styrene (SEBS) thermoplastic elastomeric block copolymer (KRATON®G-1657); 17 percent, by weight, REGALREZ®1126; and 20 percent, by weight, Petrothene NA 601 as shown in FIG. Z and Table 3.

FIG. 3 depicts a hysteresis loop for a meltblown web formed from an extrudable elastomeric composition that was formulated to reduce the amount of one component which the inventor believes may promote stress relaxation (e.g., the polyolefin). The modified extrudable elastomeric composition contained a blend of 66 percent, by weight, styrene-poly(ethylene-butylene)-styrene elastomeric block copolymer mixture (the mixture being a combination of about 44.2 percent, by weight, KRATON®G-1652 rubber and about 21.8 percent, by weight KRATON®G-1657 rubber); about 16.0 percent, by weight, REGALREZ®1126; about 6.0 percent, by weight, Petrothene NA 601; and about 12.0 percent, by weight, Drakeol 34 oil. A meltblown web formed from the SEPS copolymer extrudable composition having a relatively large amount of polyolefin and tackifying resin (FIG. 1) has lower stress relaxation and higher recoverable energy than even a meltblown web formed from the modified SEBS copolymer extrudable composition (FIG. 3).

TABLE 3

Physical Properties of Extrudable Elastomeric Compositions*

| | Conventional SEBS Composition | SEPS Composition |
|---|---|---|
| Melt Flow, 190/2.16, g/10 min | 14 | 10 |
| Tensile Strength, psi | 1800 | 3640 |
| 300% Modulus, psi | 226 | 299 |
| Elongation at Break, % | 850 | 700 |
| Set at Break, % | 60 | 25 |
| Stress Relaxation | 35 | 20 |
| Hysteresis Properties: | | |
| Recoverable Energy, % | 64 | 79 |
| Set, % | 15 | 9 |

*Determined from 3 mm wide (approximately 0.1 inch) and 0.060 inch thick dumbbell samples cut from compression molded films.

As indicated previously, the extrudable composition can be formed into a nonwoven web (e.g., a film, porous film or fibrous nonwoven web) by known extrusion techniques. A preferred extrusion technique is to form a fibrous nonwoven elastomeric web by meltblowing techniques.

Meltblowing processes generally involve extruding a thermoplastic polymer resin through a plurality of small diameter capillaries of a meltblowing die as molten threads into a heated gas stream (the primary air stream) which is flowing generally in the same direction as that of the extruded threads so that the extruded threads are attenuated, i.e., drawn or extended, to reduce their diameter to fiber or preferably microfiber size. The thus formed microfibers are then borne away from the vicinity of the die by the gas stream. The gas stream is directed onto a foraminous member, such as a screen belt or a screen drum which is moving over a vacuum box, so that the gas-borne fibers impinge upon and are collected on the surface of the foraminous member and form a cohesive fibrous nonwoven web. Meltblowing die arrangements usually extend across the foraminous collecting member in a direction which is substantially transverse to the direction of movement of the collecting surface. The die arrangements include a plurality of small diameter capillaries arranged linearly along the transverse extent of the die with the transverse extent of the die being approximately as long as the desired width of the fibrous nonwoven web which is to be produced. That is, the transverse dimension of the die is the dimension which is defined by the linear array of die capillaries. Typically, the diameter of the capillaries will be on the order of from about 0.01 inches to about 0.02 inches, for example, from about 0.0145 to about 0.018 inches. From about 5 to about 50 such capillaries will be provided per linear inch of die face. Typically, the length of the capillaries will be from about 0.05 inches to about 0.20 inches, for example, about 0.113 inches to about 0.14 inches long. A meltblowing die can extend for from about 20 inches to about 60 or more inches in length in the transverse direction.

Such meltblowing techniques, and apparatus therefor, are known in the art, and are discussed fully in U.S. Pat. No. 4,663,220, the contents of which have been previously incorporated herein by reference. For example, an extrudable elastomeric composition containing, by weight, 57.7 percent KRATON® styrene-poly(ethylene-propylene)-styrene (molecular weight 62,000) elastomeric block copolymer available from the Shell Chemical Company; 18.3 percent Petrothene NA 601 polyethylene; 18.2 percent REGALREZ®1126; and 5.8 percent mineral oil was meltblown with the extrudable elastomeric composition heated to a temperature of 480° F. Generally, and intended to be illustrative and not limiting, the following described Parameters can be used for meltblowing extrudable elastomeric compositions which are adapted to form the elastic sheets. Thus, the extrudable elastomeric compositions can be meltblown while at a temperature of 450° to 550° F., preferably 475° to 500° F., during the meltblowing. The primary air temperature, during the meltblowing, can be 475° to 525° F., preferably 500° to 520° F.; and the primary air pressure can be 1.5-8 pounds per square inch (psi) gauge, preferably 2-4 psi gauge.

EXAMPLES

Extrudable elastomeric compositions were prepared by blending varying amounts of a styrene-poly(ethylene-propylene)-styrene thermoplastic elastomeric block copolymer (molecular weight 62,000) available from the Shell Chemical Company, a polyolefin (Petrothene NA 601 polyethylene), a tackifying resin (REGALREZ®1126 hydrocarbon resin), and an extending oil (Drakeol 34 white mineral oil). In Example 2, the styrene-poly(ethylene-propylene)-styrene elastomeric block copolymer was combined with a styrene-poly(ethylene-butylene)-styrene elastomeric block copolymer available from the Shell Chemical Company under the trade designation KRATON®G-1652 to form an elastomeric block copolymer mixture. The amount of each component is expressed in weight percent in Table 4 for each extrudable elastomeric composition.

TABLE 4

| Extrudable Elastomeric Compositions (Weight Percent) | | | | | |
|---|---|---|---|---|---|
| Example | 1 | 2 | 3 | 4 | 5 |
| Styrene-poly(ethylene-propylene)-styrene block copolymer | 57.7 | 35.0 | 61.9 | 61.8 | 60.1 |
| KRATON® G-1652 rubber | 0 | 23.3 | 0 | 0 | 0 |

TABLE 4-continued

| Extrudable Elastomeric Compositions (Weight Percent) | | | | | |
|---|---|---|---|---|---|
| Example | 1 | 2 | 3 | 4 | 5 |
| Polyolefin | 18.3 | 14.0 | 8.7 | 12.9 | 13.3 |
| Tackifying resin | 18.2 | 18.4 | 19.5 | 23.8 | 26.5 |
| Extending oil | 5.8 | 9.3 | 9.9 | 1.5 | 0 |

The extrudable compositions were pressed from pellets into films using heat and pressure according to conventional compression molding techniques. The films were cut into dumbbell shaped samples that were 3mm wide (approximately 0.1 inch) and 0.060 inch thick. The stress-strain properties of the pressed films were determined in accordance with ASTM D-412 utilizing a Constant Rate of Extension Tester, Instron Model 1122 Universal Testing Instrument. Each sample was placed lengthwise in jaw faces, 3" wide × 1" height, with a jaw span or separation of 2 inches. The Instron Model 1122 Universal Test Instrument crosshead speed was set at 10 inches per minute for the first series of tests measuring the Stress-Strain properties reported in Tables 5 and 6. Measurements were taken of the sample's tensile strength, elongation at break, set, and modulus or load at 100% elongation (i.e., at 200% of the materials initial relaxed length) and 300% elongation (i.e., at 400% of the materials initial relaxed length).

Hysteresis properties were measured using the Instron Model 1122 Universal Test Machine with the crosshead speed set at 1 inch per minute. The loss, dynamic, recoverable energy and set were determined as previously described in the "Definition" section and are reported in Tables 5 and 6.

The stress relaxation was measured using the Instron Model 1122 Universal Test Machine and determined as previously described in the "Definition" section. The results are reported in Tables 5 and 6.

Stress-strain properties at higher cross-head speeds were determined in a second series of stress-strain tests. The Instron Model 1122 Universal Test Instrument was used with the crosshead speed set at 20 inches per minute. The compression molded film dumbbell samples were elongated 250% (i.e., to 350% of their initial length) through two cycles. Measurements were taken of the load at 100% elongation during the load portion of the first cycle and the load at 100% elongation during the unload portion of the cycle. The measurements were repeated at 100% elongation during the load portion of the second cycle and at 100% elongation during the unload portion of the second cycle. The difference between the measurements taken during the load portion of the cycles and the difference between the measurements taken during the unload portion of the cycles were calculated and expressed as a percentage of the load and unload measurements, respectively, for each portion of the first cycle. The results are reported in Tables 5 and 6 under the heading "250% Elongation".

The sample was then extended to 300% elongation (i.e., to 400% of its initial length) at 20 inches per minute and the load was measured upon reaching 300% elongation, after being held at 300% elongation for 1 minute and for 15 minutes. The difference was determined between the loads measured upon reaching 300% elongation and (a) the load measured after the sample was held at 300% elongation for 1 minute and (b) the load measured after the sample was held at 300% elongation for 15 minutes. The stress relaxation results reported in Tables 5 and 6 were measured after 1 minute and after 15 minutes.

TABLE 5

| | Physical Properties* | | |
|---|---|---|---|
| Example | 1 | 2 | 3 |
| Melt Flow, 190/2.16, g/10 min | 12.0 | 11.4 | 21.0 |
| Stress-Strain Properties: (10 in/min crosshead speed) | | | |
| 100% Modulus, psi | 160 | 135 | 155 |
| 300% Modulus, psi | 298 | 270 | 280 |
| Tensile Strength, psi | 1520 | 1600 | 1250 |
| Elongation at Break, % | 690 | 700 | 675 |
| Set (at break), % | 40 | 30 | 20 |
| Hysteresis Properties: (Loop 1; 1 in/min crosshead speed) | | | |
| Loss, % | 16 | 14 | 18 |
| Dynamic, % | 10 | 6 | 5 |
| Recoverable Energy, % | 74 | 80 | 77 |
| Set, % | 9 | 8 | 8 |
| Unload Stress, Loop 2, psi | 135 | 130 | 125 |
| Stress Relaxation, %: (after 30 min at 160% elongation at 20 in/min crosshead speed) | 24 | 21 | 24 |
| Test "B" Results: (20 in/min crosshead speed) 250% Elongation: | | | |
| Stress at 100% - Load 1, psi | 185 | 168 | 165 |
| Load 2, psi | 142 | 130 | 134 |
| % Diff, Load 1 v. 2 | 23 | 23 | 19 |
| Unload 1, psi | 115 | 114 | 122 |
| Unload 2, psi | 111 | 110 | 119 |
| % Diff, Unl. 1 v. 2 | 3.5 | 3.1 | 2.5 |
| 300% Elongation: | | | |
| Peak Stress, psi | 312 | 302 | 279 |
| Stress at 1 Minute, psi | 261 | 252 | 243 |
| Stress at 15 Minutes, psi | 239 | 224 | 214 |
| Stress Relaxation at 1 Minute, % | 16 | 16 | 13 |
| Stress Relaxation at 15 Minutes, % | 23 | 25.5 | 23 |

*Determined in accordance with ASTM D-412 using 3 mm wide (approximately 0.1 inch) and 0.060 inches thick dumbbell samples that are cut from films from compression molded pellets.

TABLE 6

| | Physical Properties* | |
|---|---|---|
| Example | 4 | 5 |
| Melt Flow, 190/2.16, g/10 min | 8.0 | 8.8 |
| Viscosity at 450° F., 3500 recip. sec., poises | 440 | 418 |
| Stress-Strain Properties: (10 in/min crosshead speed) | | |
| 100% Modulus, psi | 160 | 145 |
| 300% Modulus, psi | 270 | 260 |
| Tensile Strength, psi | 3440 | 3515 |
| Elongation at Break, % | 720 | 700 |
| Set (at break), % | 30 | 30 |
| Hysteresis Properties: (Loop 1; 1 in/min crosshead speed) | | |
| Loss, % | 14 | 13 |
| Dynamic, % | 9 | 10 |
| Recoverable Energy, % | 77 | 77 |
| Unload Stress, Loop 2, psi | 130 | 125 |
| Stress Relaxation, %: (after 30 min at 160% elongation at 20 in/min crosshead speed) | 21 | 21 |
| Test "B" Results: (s0 in/min crosshead speed) 250% Elongation: | | |
| Stress at 100% - Load 1, psi | 165 | 174 |
| Load 2, psi | 132 | 136 |
| % Diff., Load 2 v. 2 | 20 | 22 |
| Unload 1, psi | 112 | 112 |
| Unload 2, psi | 109 | 107 |
| % Diff., Unload 1 v. 2 | 2.7 | 4.5 |
| 300% Elongation: | | |
| Peak Stress, psi | 276 | 292 |
| Stress at 1 Minute, psi | 240 | 248 |
| Stress at 15 Minutes, psi | 220 | 226 |
| Stress Relaxation at 1 Minute, % | 13 | 15 |
| Stress Relaxation at 15 minutes, % | 20 | 22 |

*Determined in accordance with ASTM D-412 using 3 mm wide (approximately 0.1 inch) and 0.060 inches thick dumbbell samples that are cut from films from compression molded pellets.

Table 7 is a list of compositions (Example 6, 7 and 8) having ratios of styrene-poly(ethylene-propylene)-styrene to styrene-poly(ethylene-butylene)-styrene block copolymer of 100/0, 75/25 and 50/50. The total block copolymer content is fixed at 67.8%. Other components are tackifying resin at a constant percentage of 21.4 and extending oil at a constant percentage of 10.8. Table 8 shows the properties of these compositions.

The best elastic recovery properties among Examples 6, 7 and 8 are shown by Example 6, having the highest level of styrene-poly(ethylene-propylene)-styrene block copolymer. Example 7, at 75/25 SEPS/SEBS ratio, has intermediate elastic recovery properties. Example 8, at 50/50 SEPS/ SEBS, is beginning to lose the expression of advantageous elastic recovery properties afforded by SEPS, i.e. the stress relaxation is 33%. By elastic recovery is meant hysteresis properties, especially recoverable energy, where a high numerical figure is desirable; stress relaxation, where a low figure is desirable; and comparisons of Loop 1 and Loop 2 in hysteresis tests where small differences are desirable.

Although SEPS is clearly capable of better elastic recovery properties than SEBS, sometimes it is desired to achieve good elastic recovery at higher modulus values than are afforded by SEPS alone. Conversely, sometimes it is desired to improve the elastic recovery properties of an SEBS-based composition. In either case, a SEPS/SEBS blend may provide the desired combination of elastic recovery (strongly contributed by SEPS) and modulus (strongly contributed by SEBS). In Table 8 the general term "modulus" is expressed by 100% Modulus and 300% Modulus in the stress-strain tests, the Unload Stress (retractive modulus) in the hysteresis tests, stress at 100% (load and unload) in Test "B" in 250% Elongation tests and Peak Stress in Test "B" in 300% Elongation tests.

TABLE 7

| Blends of SEPS-Based and SEBS-Based Compositions (Weight percent) | | | |
|---|---|---|---|
| Example | 6 | 7 | 8 |
| Styrene-poly(ethylene-propylene)-styrene (SEPS) block copolymer | 67.8 | 50.9 | 33.9 |
| Styrene-poly(ethylene-butylene)-styrene (SEBS) block copolymer (KRATON ® G1652 Rubber) | — | 16.9 | 33.9 |
| Tackifying resin | 21.4 | 21.4 | 21.4 |
| Extending oil | 10.8 | 10.8 | 10.8 |

TABLE 8

| Physical Properties of Blends | | | |
|---|---|---|---|
| Example | 6 | 7 | 8 |
| Melt Flow, 190/2.16, g/10 min | 7.8 | 6.5 | 6.7 |
| Stress-Strain Properties: (10 in/min crosshead speed) | | | |
| 100% Modulus, psi | 115 | 140 | 160 |
| 300% Modulus, psi | 200 | 240 | 320 |
| Tensile Strength, psi | 2350 | 2875 | 2720 |
| Elongation at Break, % | 725 | 725 | 675 |
| Set at Break, % | 10 | 10 | 10 |

TABLE 8-continued

Physical Properties of Blends

| Example | 6 | 7 | 8 |
|---|---|---|---|
| Hysteresis Properties: (Loop 1; 1 in/min crosshead speed) | | | |
| Loss, % | 7 | 12 | 31 |
| Dynamic, % | 3 | 2 | 4 |
| Recoverable Energy, % | 90 | 86 | 65 |
| Unload Stress, Loop 2, psi | 112 | 120 | 210 |
| Stress Relaxation, %: (after 30 min at 160% elongation at 20 in/min crosshead speed) | 19 | 23 | 33 |
| Test "B" Results: (20 in/min crosshead speed) 250% Elongation: | | | |
| Stress at 100% - Load 1, psi | 127 | 149 | 244 |
| Load 2, psi | 115 | 126 | 151 |
| % Diff. | 9 | 15 | 37 |
| Unload 1, psi | 110 | 122 | 139 |
| Unload 2, psi | 108 | 118 | 135 |
| % Diff. | 1.8 | 2.8 | 2.8 |
| 300% Elongation: | | | |
| Peak Stress, psi | 208 | 246 | 392 |
| Stress at 1 Minute, psi | 191 | 216 | 307 |
| Stress at 15 Minutes, psi | 176 | 196 | 264 |
| Stress Relaxation at 1 Minute, % | 8.4 | 12 | 22 |
| Stress Relaxation at 15 Minutes, % | 16 | 19 | 32 |

Table 9 gives the formulation for Example 9, which is a composition similar to previous examples except the base polymer is a star polymer prepared by coupling active S-I. chains with a divinyl benzene (DVB) oligomer and subsequently hydrogenating the resultant polymer to give a (S-EP)$_x$.Y polymer where x is the number of S-EP arms attached to Y, the DVB coupling agent. In this example about 93% of the S-I arms reacted with DVB oligomer. The individual arms consisted of a 5,900 mol. wt. polystyrene block and a 26,000 mol. wt. polyisoprene block. Total (S-EP)$_x$Y mol. wt. after coupling and hydrogenation was about 260,000. The number of arms attached to the DVB oligomer was greater than seven. The polystyrene/ poly(ethylene.propylene) ratio was 20/80.

Table 10 shows the physical properties of the Example 9 composition. The elastic recovery properties were comparable to those of other styrene-ethylene/propylene polymer-based compositions within the scope of this invention.

TABLE 9

| (Weight Percent) | Example 9 |
|---|---|
| Star styrene-poly(ethylene-propylene) block copolymer, (S-EP)$_x$ · Y | 57.8 |
| Polyolefin | 18.6 |
| Tackifying Resin | 23.6 |

TABLE 10

Physical Properties of Example 9 Composition (See Table 9)

| Melt Flow, 190/2.16, g/10 min. | 9.9 |
|---|---|
| Stress-Strain Properties: (10 in/min crosshead speed) | |
| 100% Modulus, psi | 205 |
| 300% Modulus, psi | 376 |
| Tensile Strength, psi | 2690 |
| Elongation at Break, % | 600 |
| Set at Break, % | 38 |
| Hysteresis Properties: (Loop 1; 1 in/min crosshead speed) | |

TABLE 10-continued

Physical Properties of Example 9 Composition (See Table 9)

| Loss, % | 17 |
|---|---|
| Dynamic % | 9 |
| Recoverable Energy, % | 74 |
| Unload Stress, Loop 2, psi | 138 |
| Stress Relaxation, %: (after 30 min at 160% elongation at 20 in/min crosshead speed) | 23 |
| Test "B" Results: (20 in/min crosshead speed) 250% Elongation: | |
| Stress at 100% - Load 1, psi | 188 |
| Load 2, psi | 135 |
| % Diff. | 28 |
| Unload 1, psi | 104 |
| Unload 2, psi | 102 |
| % Diff. | 1.9 |
| 300% Elongation: | |
| Peak Stress, psi | 318 |
| Stress at 1 Minute, psi | 264 |
| Stress at 15 Minutes, psi | 240 |
| Stress Relaxation at 1 Minute, % | 17 |
| Stress Relaxation at 15 Minutes, % | 24 |

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An elastomeric composition for extrusion into an elastic sheet having a stress relaxation of less than about 30 percent consisting of:
   (a) an elastomeric polymer selected from the group consisting of styrene-poly(ethylene-propylene)-styrene elastomeric block copolymer and a mixtrue of at least about 55 parts by weight of styrene-(ethylene-propylene)-styrene block copolymers per 100 parts by weight of elastomeric polymer and styrene-poly(ethylene-butylene)-styrene elastomeric block copolymers wherein the styrene-poly(ethylene-propylene)-styrene elastomeric block copolymer has the formula:

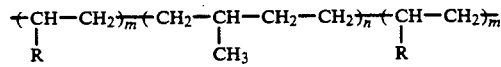

wherein m is an integer from about 38 to about 337; and n is an integer from about 500 to about 1860; and R is selected from the group consisting of phenyl groups and substituted phenyl groups; and the weight ratio of polystyrene endblocks to poly-(ethylene-propylene) endblocks ranges from about 10:90 to about 25:75; and
   (b) no less than about 15 percent by weight and no more than abut 28 percent by weight of a tackifying resin.

2. An extrudable elastomeric composition for extrusion into an elastic sheet having a stress relaxation of less than about 30 percent consisting of:
   (a) from about 50 to about 80 percent by weight of an elastomeric polymer selected from the group consisting of styrene-poly(ethylene-propylene)-styrene elastomeric block copolymer and a mixture of at least about 55 parts by weight of styrene-(ethylene-propylene)-styrene block copolymers per 100 parts by weight of elastomeric polymer and styrene-poly(ethylene-butylene)-styrene elastomeric block copolymers wherein in the styrene-poly(ethylene-propylene)-styrene elastomeric block copolymer has the formula:

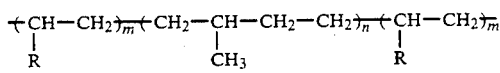

wherein m is an integer from about 38 to about 337; and n is an integer from about 500 to about 1860; and R is selected from the group consisting of phenyl group and substituted phenyl groups; and the weight ratio of polystyrene endblocks to poly(ethylene-propylene) endblocks ranges from about 10:90 to about 25:75;

(b) from about 3 to about 25 percent by weight of a polyolefin;

(c) from about 15 to about 28 percent of a tackifying resin; and (d) from about 0 to about 15 percent by weight of an extending oil.

3. The composition of claim 2 wherein the polyolefin is selected from the group including polyethylene, polypropylene, polybutylene, ethylene copolymers, propylene copolymers, butylene copolymers and mixtures thereof.

4. The composition of claim 2 wherein the extending oil is a mineral oil.

* * * * *